April 2, 1968

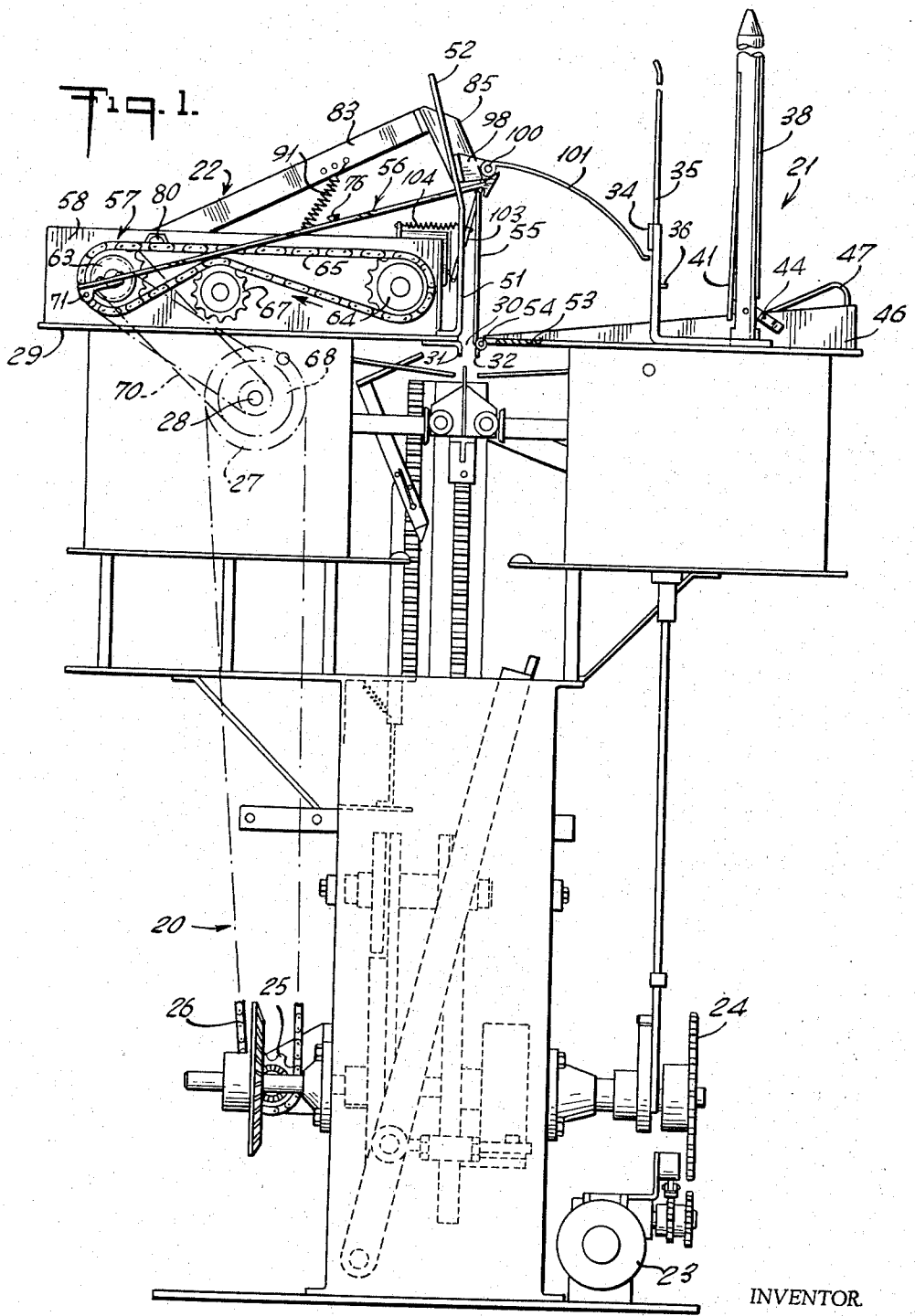

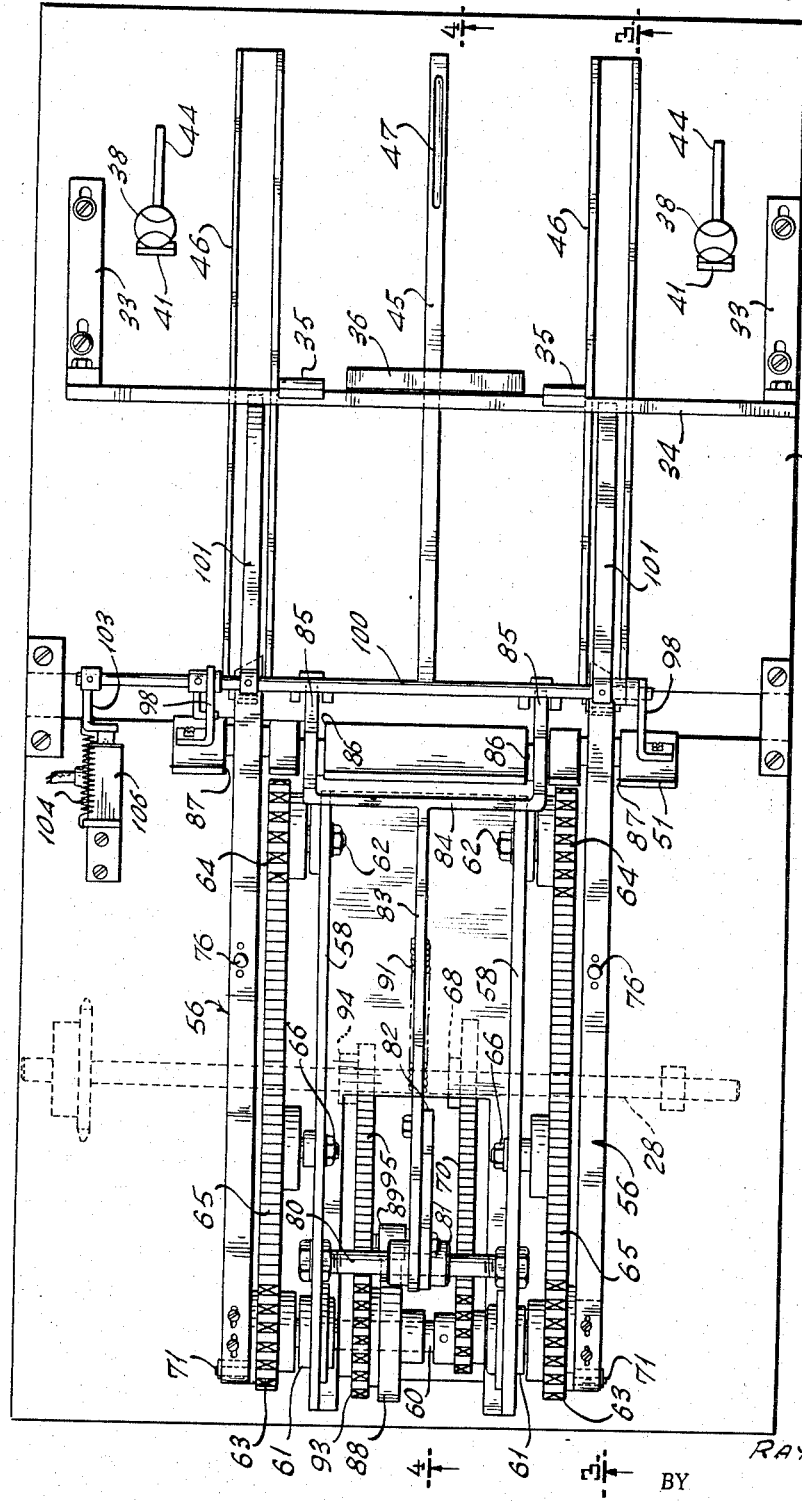

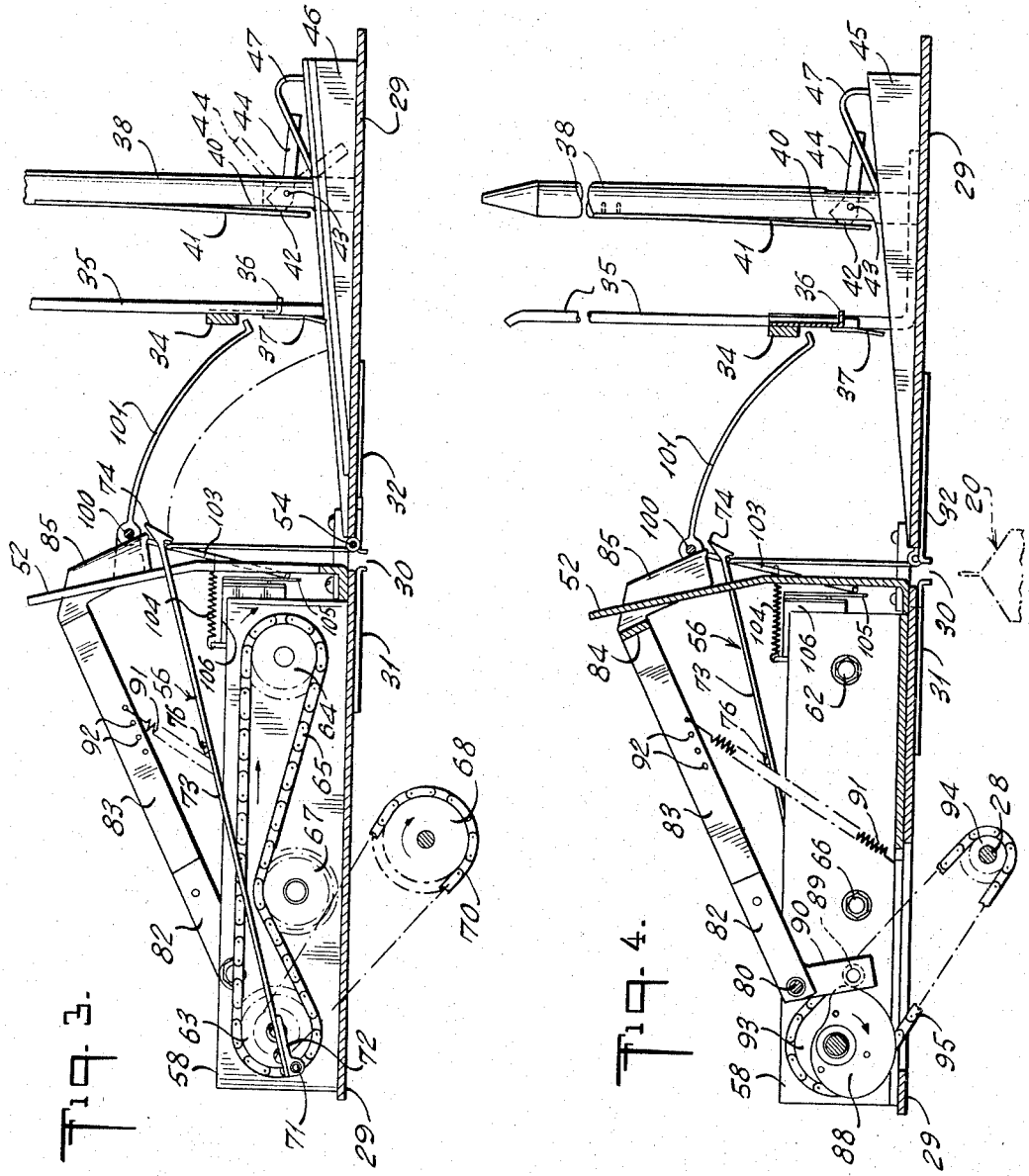

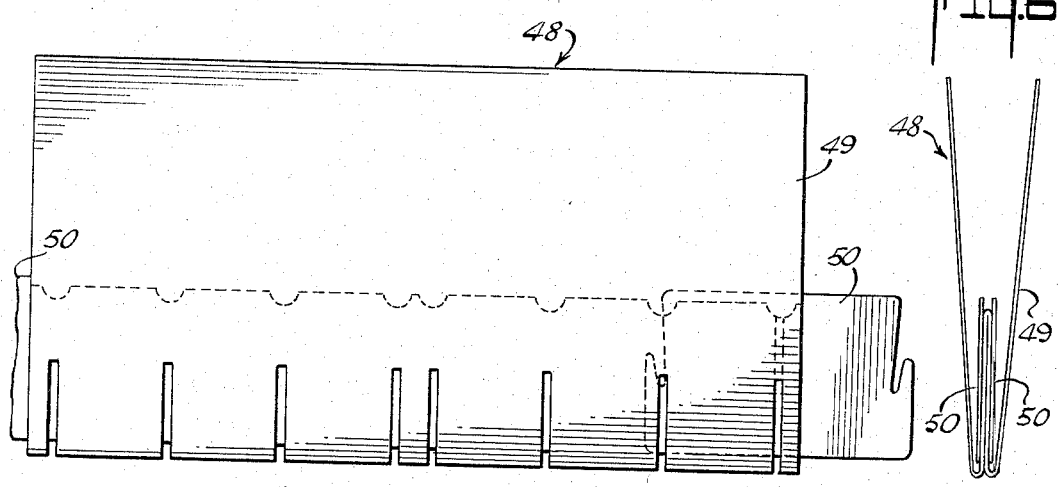
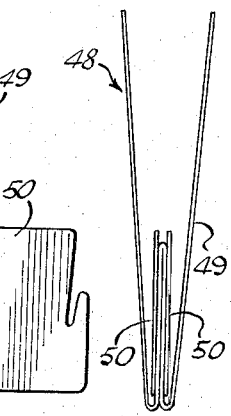
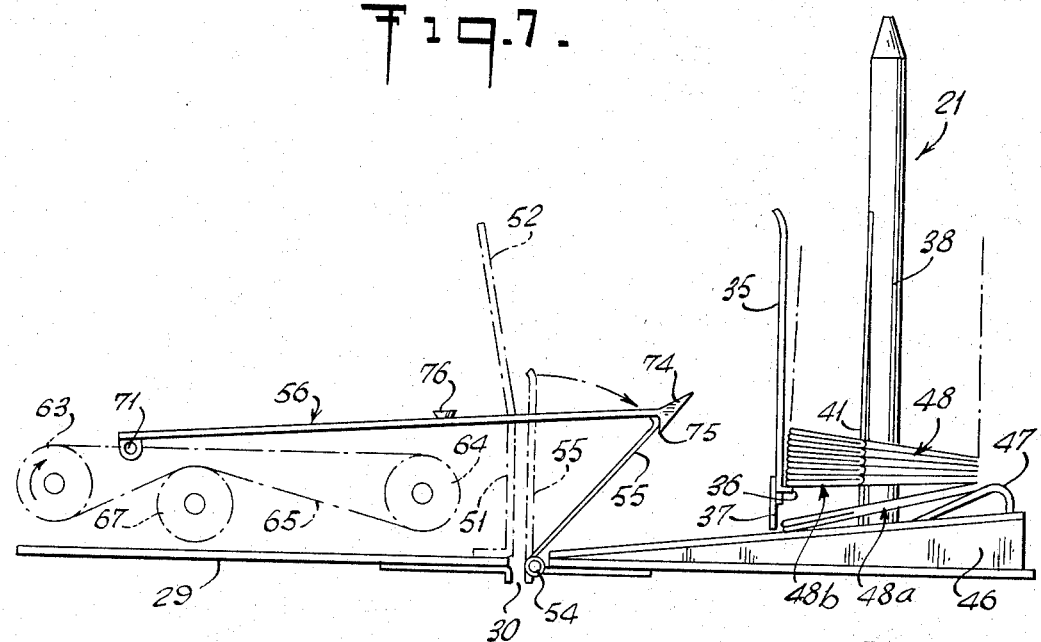

R. VAHLE 3,375,955

FEED MECHANISM

Filed Oct. 30, 1962

INVENTOR.
RAYMOND VAHLE
BY
Mason, Porter, Diller & Stewart
ATTORNEY

April 2, 1968 R. VAHLE 3,375,955
FEED MECHANISM
Filed Oct. 30, 1962 10 Sheets-Sheet 6
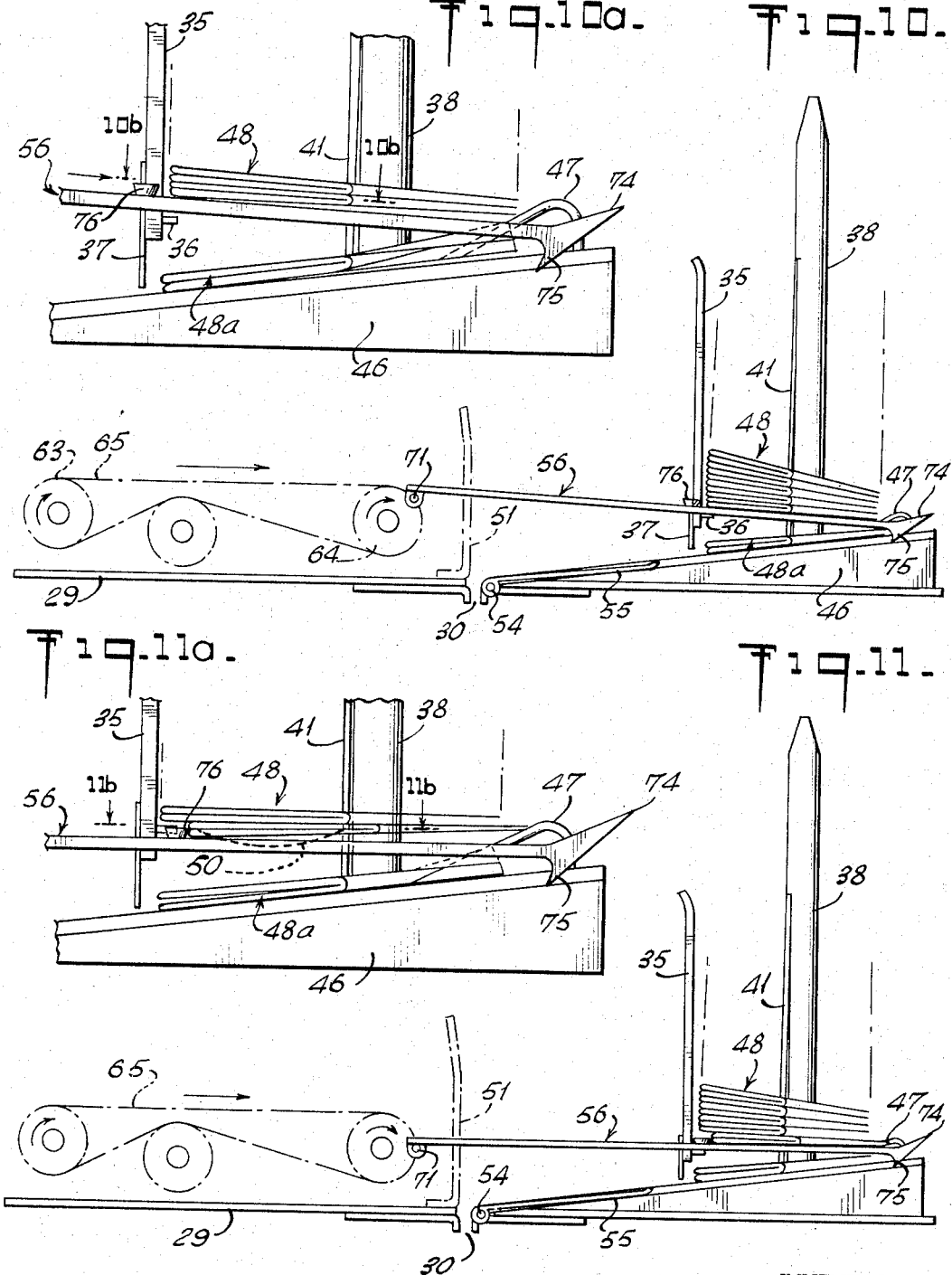
INVENTOR.
RAYMOND VAHLE
BY
Mason, Porter, Diller & Stewart
ATTORNEY

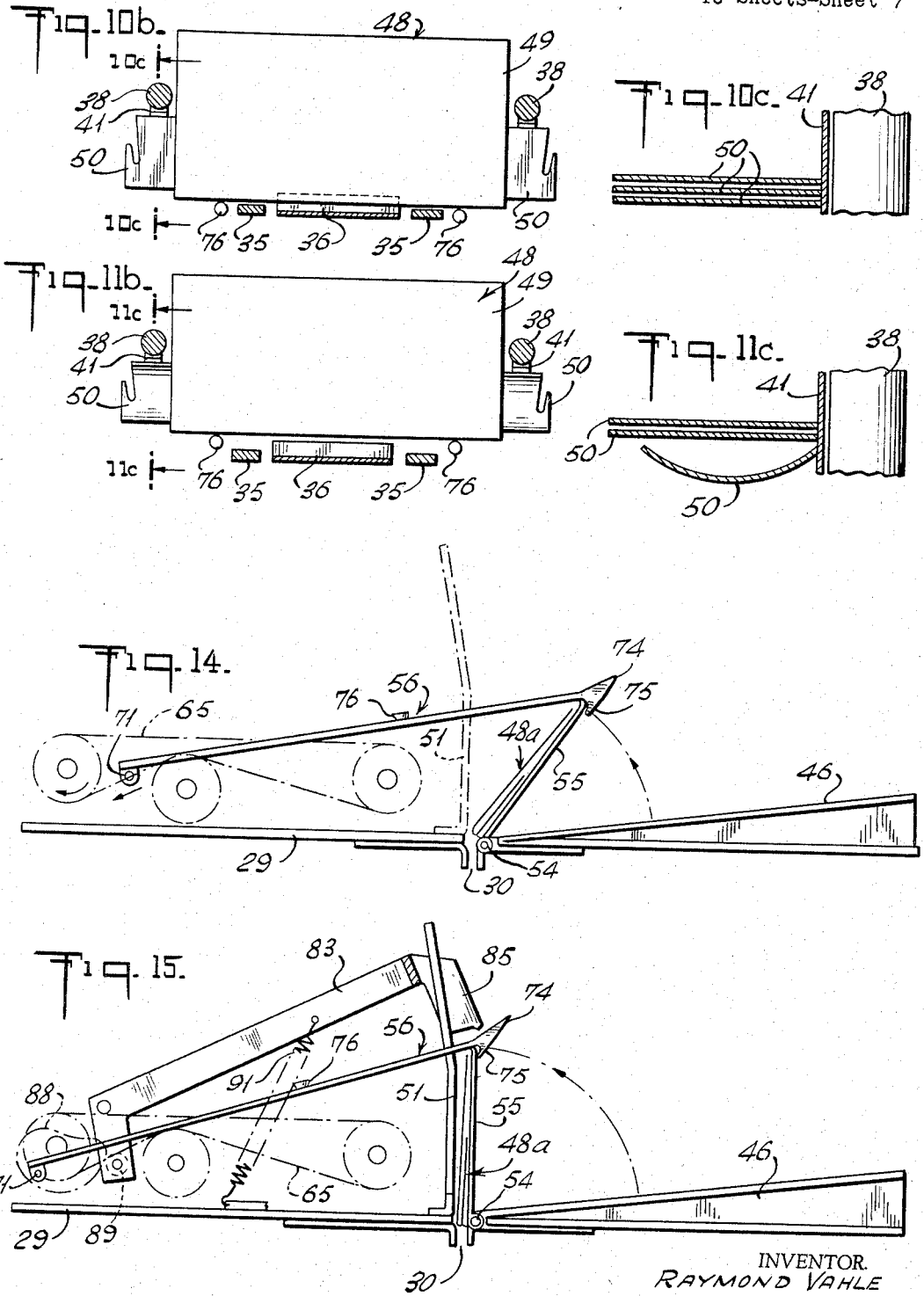

April 2, 1968  R. VAHLE  3,375,955
FEED MECHANISM
Filed Oct. 30, 1962  10 Sheets-Sheet 8
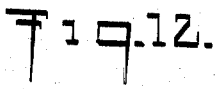
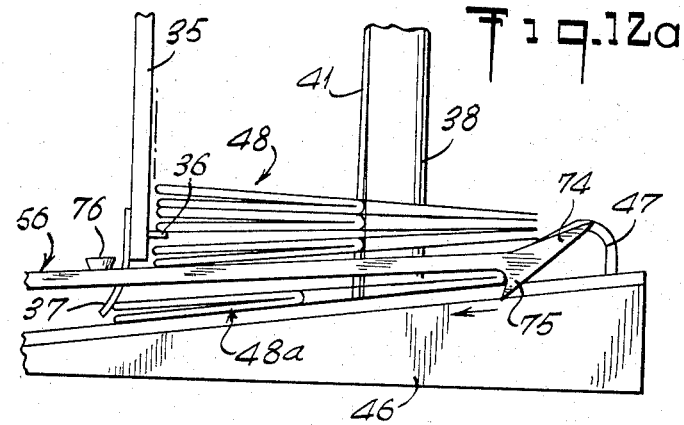
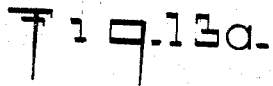 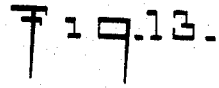
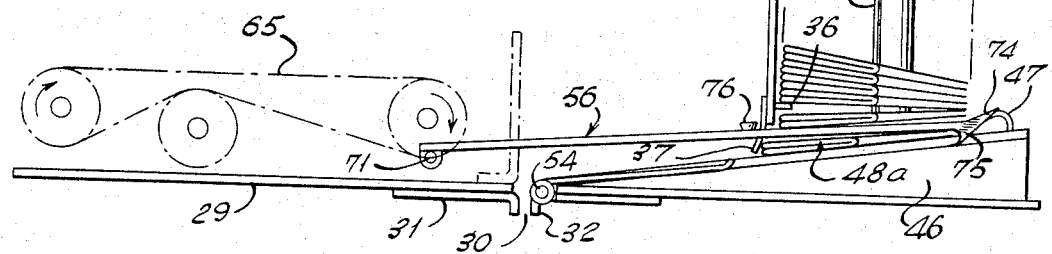
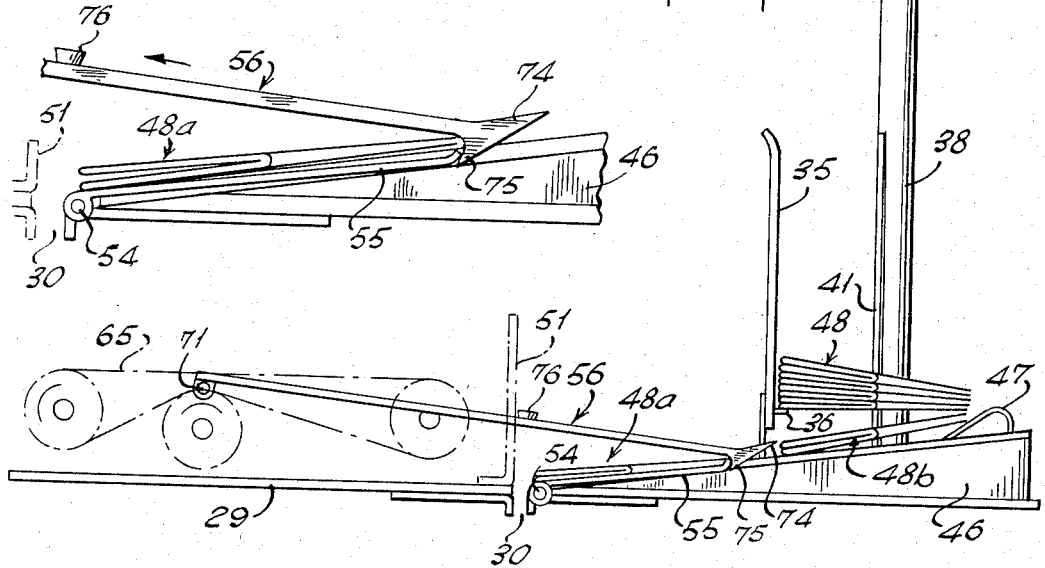
INVENTOR.
RAYMOND VAHLE
BY
Mason, Porter, Diller & Stewart
ATTORNEY April 2, 1968      R. VAHLE      3,375,955
FEED MECHANISM
Filed Oct. 30, 1962      10 Sheets-Sheet 9
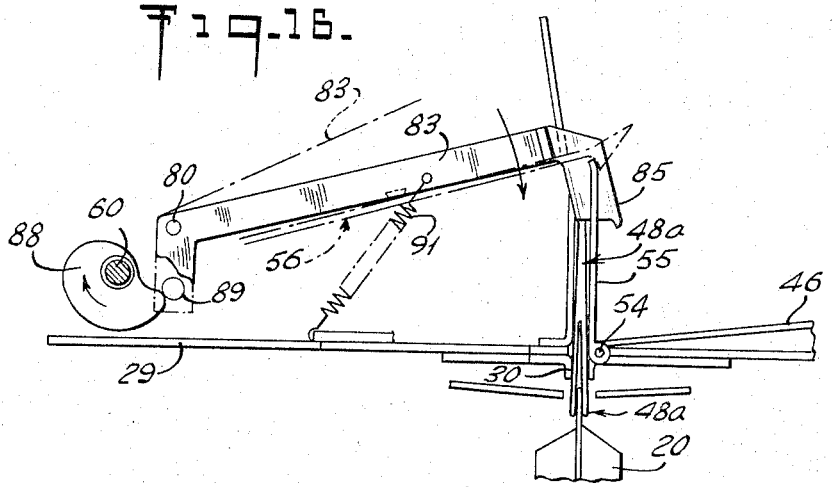
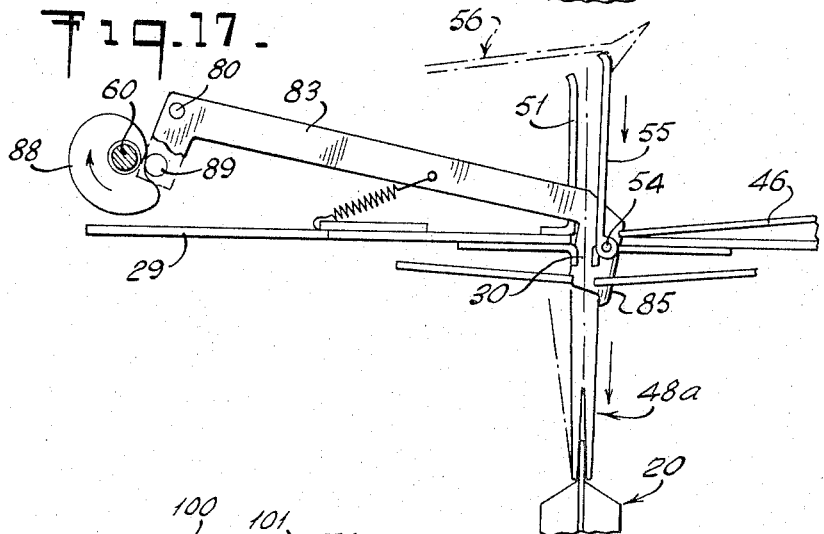
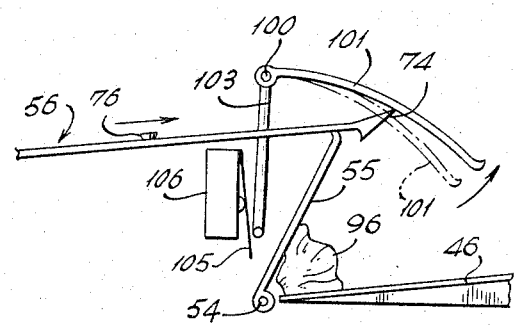
INVENTOR.
RAYMOND VAHLE
BY
ATTORNEY

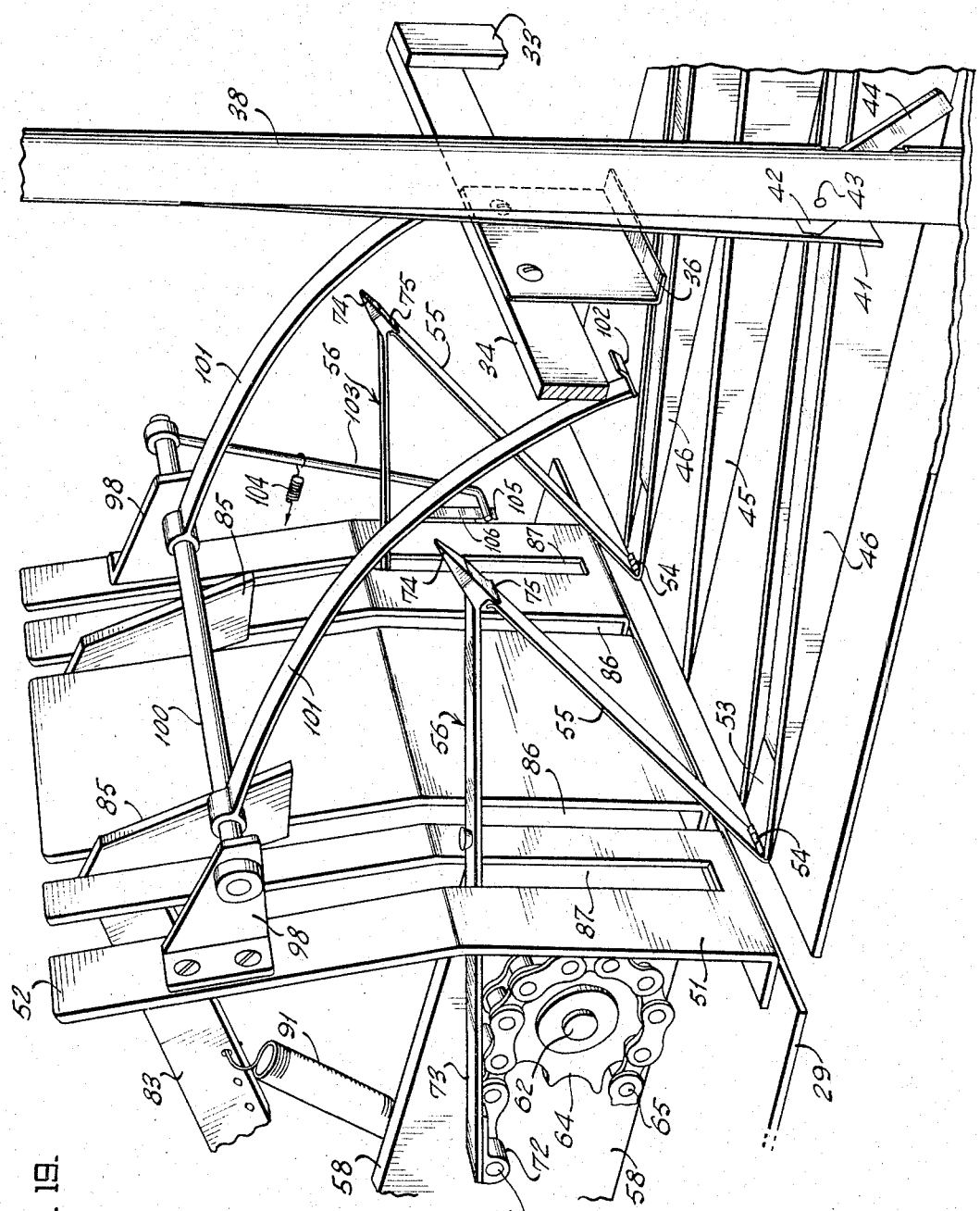

United States Patent Office 3,375,955
Patented Apr. 2, 1968

3,375,955
FEED MECHANISM
Raymond Vahle, Tappan, N.Y., assignor to Continental Can Company, Inc., New York, N.Y., a corporation of New York
Filed Oct. 30, 1962, Ser. No. 234,167
15 Claims. (Cl. 221—13)

This invention relates in general to new and useful improvements in feed mechanisms, and more specifically to a novel feed mechanism for feeding blanks to a mechanism for setting up egg cartons.

This invention particularly relates to the feeding of egg carton blanks along a predetermined path to an existing type of egg cartons setting up mechanism and this feed mechanism is synchronized with respect to the operation of the egg carton setting up mechanism.

The primary object of this invention is to provide a novel feed mechanism which is of a construction to remove a lowermost blank and to pivot such blank into alignment with a predetermined blank path.

Another object of this invention is to provide a novel feed mechanism which includes a fixed guide and a pivotally mounted guide, and there being associated with the guides a mechanism for first positioning an article on the pivotally mounted guide, and then pivoting the pivotally mounted guide to a position generally parallel to the fixed guide wherein the two guides define momentarily a path which is aligned with a predetermined path along which the article is to travel.

Another object of this invention is to provide a feed mechanism for removing an article from a hopper and positioning the article along a predetermined path, the feed mechanism including a fixed guide disposed along one side of the path, and a pivotal guide disposed adjacent the fixed guide and on the opposite side of the path, means for removing a lowermost article from the hopper and positioning the same on the pivotal guide and then swinging the pivotal guide to a position generally parallel to the fixed guide wherein the article is aligned with the predetermined path, and then forcibly moving the article from between the two guides along the path.

Another object of this invention is to provide in a feed mechanism a feed member which is mounted for both sliding and swinging movement, the feed member being pivotally connected to an endless conveyor member and being reciprocated by the conveyor member while being free to be pivoted in the use thereof.

Yet another object of this invention is to provide a novel feed member for use in a feed mechanism for removing articles from a hopper and positioning the articles along a predetermined path, the feed member having means thereon for first moving between a previously released article and the next lower article disposed within a hopper, and then releasing the next lower member from the hopper after which the previously released member is moved from beneath the hopper by the feed member.

Another object of this invention is to provide a novel feed member for use in a feed mechanism for removing articles from a hopper, the feed member including an elongated arm which is provided at one end thereof with a rearwardly facing pointed end for engagement between the two articles, a forwardly opening hook adjacent the pointed end for engagement with an article to move the article from the hopper, and a finger spaced from the pointed end for engaging an overlying article and releasing the same from the hopper.

Still another object of this invention is to provide a novel feed mechanism for feeding blanks from the hopper, the feed mechanism including a pivotal guide, a feed member slidable over the guide and having a hook at one end thereof, the hook being engageable with an article for sliding the article on to the guide, and then being engageable with the guide for effecting the swinging of the guide to swing the article to a desired position.

Another object of the invention is to provide a novel feed mechanism as stated in the foregoing object together with a feed mechanism stopping switch operable in response to the jamming of the guide against return movement of the sliding of the feed member thereover.

Another object of this invention is to provide in a feed mechanism a novel guide which includes a feed member driven from a driving shaft, and an article moving member, the feed member having a very long path of movement as compared to the article moving member, and there being driven means connected to the drive shaft and to the article moving member and the feed member to operate the two in timed relation.

Still another object of this invention is to provide a novel hopper construction for blanks, the hopper construction including a lower platform and upstanding guides, one of the guides having a shelf on which a lowermost blank within the hopper is seated, and the platform having a ramp spaced from and opposed to the shelf, whereby when the lowermost blank disposed in the hopper and resting on the shelf is engaged and moved slightly toward the ramp, it is released from the shelf and is then fed reversely by the slope of the ramp.

A further object of this invention is to provide a novel feed member for use with the hopper set forth above, the feed member being provided with a pointed end for engagement between an article seated on the shelf of the hopper and an article seated on the platform, whereby the feed member may pass between the two blanks, the feed member being provided with a finger for engaging a blank seated on the shelf to move the same off of the shelf, and the feed member further being provided with a hook for engaging the blank disposed on the platform and sliding the same from beneath the blank seated on the shelf.

A further object of this invention is to provide a novel method of feeding blanks from a hopper, the method including the steps of releasing a blank supported by a hopper by rearwardly bending the blank momentarily to disengage the same from a shelf, and the same series of movements engaging a previously released blank and moving the same from beneath the hopper to permit the last released blank to drop into a position to be moved in the next operation.

With the above and other objects in view that will hereinafter appear, the nature of the invention will be more clearly understood by a reference to the following detailed description, the appended claims and the several views illustrated in the accompanying drawings.

In the drawings:

FIGURE 1 is a side elevational view of the machine which is the subject of this invention and shows generally the details thereof.

FIGURE 2 is a top plan view of the machine of FIGURE 1 and shows further the details of construction thereof.

FIGURE 3 is a fragmentary longitudinal sectional view taken along the line 3—3 of FIGURE 2 and shows the specific details of the construction of the hopper and the feed mechanism.

FIGURE 4 is a longitudinal fragmentary vertical sectional view similar to FIGURE 3 and taken along the line 4—4 of FIGURE 2 and shows further the details of the feed mechanism.

FIGURE 5 is an elevational view of an egg carton blank to be fed by the feed mechanism.

FIGURE 6 is an end view of the egg carton blank of FIGURE 5.

FIGURE 7 is a schematic view somewhat similar to FIGURE 3 and shows the feed mechanism moving towards the hopper for removing a blank therefrom.

FIGURE 10 is a schematic view showing the feed member adanvced to a position wherein it is engaged with the previously released blank.

FIGURE 10a is an enlarged fragmentary elevational view showing the specific relationship of the feed member with respect to the blanks of the hopper.

FIGURE 10b is a fragmentary transverse horizontal sectional view taken generally along the line 10b—10b of FIGURE 10a on a small scale and shows generally the position of the lowermost blank in the hopper prior to the removable engagement thereof by the feed member.

FIGURE 10c is a fragmentary vertical sectional view taken along the line 10c—10c of FIGURE 10b and shows schematically the arrangement of the blanks in the hopper prior to the engagement thereof by the feed member.

FIGURE 11 is a schematic view similar to FIGURE 10 and shows the lowermost blank supported by the hopper being engaged and being bowed so as to be removed from the supporting shaft of the hopper.

FIGURE 11a is an enlarged fragmentary vertical sectional view showing the specific engagement of the lowermost blank by a finger on the feed member.

FIGURE 11b is a fragmentary horizontal sectional view on a reduced scale taken generally on the line 11b—11b of FIGURE 11a and shows the manner in which the lowermost blank carried by the hopper is shifted by the feed member.

FIGURE 11c is a fragmentary transverse vertical sectional view taken along the line 11c—11c of FIGURE 11b and schematically shows the manner in which a portion of the lowermost blank is bowed to effect the release thereof from the supporting shaft of the hopper.

FIGURE 12 is a schematic view similar to FIGURE 11 and shows the feed member in its forward stroke engaged with the previously released blank for the removal thereof from beneath the hopper.

FIGURE 12a is an enlarged fragmentary elevational view showing more specifically the relationship of the feed member with respect to the blanks and the hopper.

FIGURE 13 is a schematic view similar to FIGURE 12 and shows the forward movement of the feed member to a position wherein it has moved the blank into overlying relation to the pivotal guide and is engaged with the pivotal guide.

FIGURE 13a is an enlarged fragmentary elevational view showing the specific engagement of the feed member and the blank with the pivotal guide.

FIGURE 14 is a vertical schematic view showing the feed member in a position swinging the pivotal guide and the blank toward upstanding positions.

FIGURE 15 is a schematic view showing the pivotal guide swung to an upstanding position parallel to the fixed guide and the blank carried thereby positioned along the path to be fed to the carton setting up mechanism.

FIGURE 16 is a schematic view showing the blank being fed along the path by a member which engages and downwardly forces the same.

FIGURE 17 is a schematic view showing the blank entirely fed into the carton setting up mechanism.

FIGURE 18 is a fragmentary schematic view showing the details of an automatic mechanism for stopping the operation of the feed mechanism in the event return pivoting of the pivotal guide is prevented.

FIGURE 19 is a fragmentary perspective view of the feed mechanism and shows the specific details thereof, the view being on a large scale.

Figure 8:
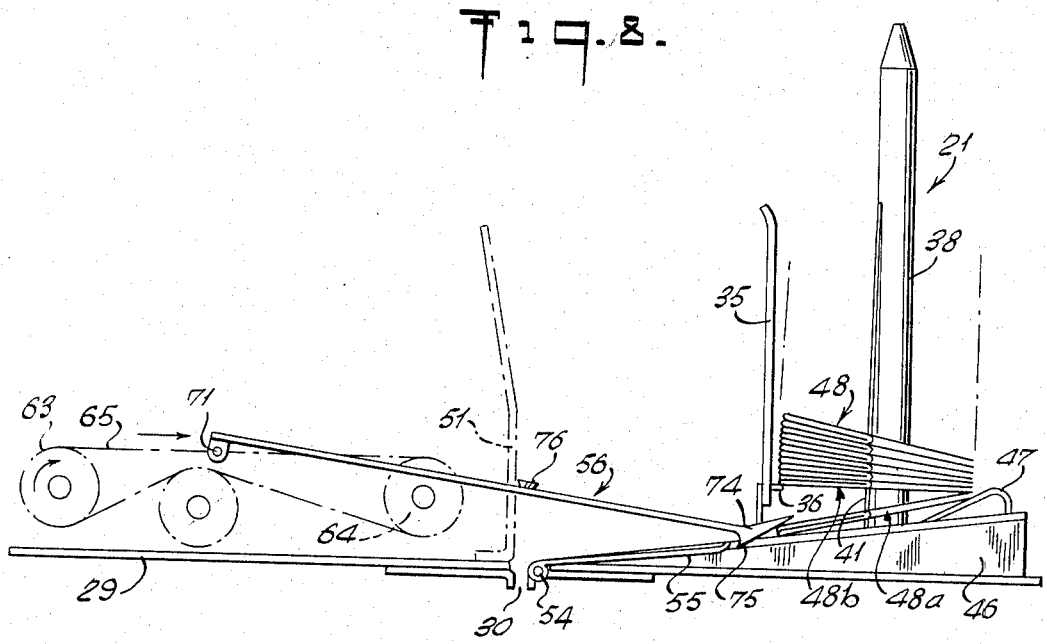
FIGURE 8 is a schematic view showing the initial engagement of the feed member with a previously released blank disposed beneath the hopper.

Referring now to the drawings in detail, it will be seen that there is illustrated in FIGURE 1 an egg carton setting up machine which is generally referred to by the numeral 20. The egg carton setting up machine 20 has associated therewith a hopper, generally referred to by the numeral 21, which is part of a feed mechanism, generally referred to by the numeral 22, for feeding egg carton blanks to the egg carton setting up mechanism 20. Except for the fact that the feed mechanism 22 is for the purpose of supplying blanks to the egg carton setting up mechanism 20 and is driven in timed relation with respect thereto, the egg carton setting up machine 20 need not be described in detail. However, it is pointed out that the egg carton setting up machine 20 is powered by an electric motor 23 and includes a drive mechanism 24 which drives numerous mechanisms including a sprocket 25 appearing at the lower left-hand corner of FIGURE 1. The sprocket 25 has entrained thereover a drive chain 26 which, in turn, is entrained over a sprocket 27 mounted on a shaft 28 which is disposed in the upper left-hand portion of the egg carton setting up mechanism 20. The frame of the egg carton setting up mechanism also includes a divided table 29 which has a blank receiving passage or opening 30 therethrough. A pair of fixed guides 31 and 32 are secured to the underside of the table 29 on opposite sides of the opening 30 for assuring the proper movement of an egg carton blank through the table 29 to the egg carton setting up mechanism 20.

The hopper 21 includes a pair of angle brackets 33 which are secured to the right portion of the table 29 and which have extending between the upper ends thereof a transverse bar 34. A pair of transversely spaced, upstanding front guides 35 are secured to and supported by the bar 34 in the position as best shown in FIGURE 2. The bar 34 also supports a depending shelf 36 which is centrally located between the front guides 35. In addition, each of the front guides 35 is provided at the lower end thereof with a depending spring finger 37, as is clearly shown in FIGURE 4, for example.

The hopper 21 also includes a pair of upstanding rear guides 38 which are disposed to the right of the guides 35, as viewed in FIGURES 1 and 2, and are disposed transversely outwardly of the guides 35, as is clearly shown in FIGURE 2. Each of the guides 38 has a front portion thereof removed as at 40 and a spring finger 41 is seated in place of the removed portion of each of the guides 38. Each guide 38 is provided with a cam member 42 which engages the rear surface of each spring finger 41. Cam member 42 is pivotally mounted on a horizontal pin 43 and is provided with a handle 44 to facilitate the positioning thereof. By properly adjusting the cam member 42, the spacing between the guides 35 and 38 may be minutely adjusted.

The hopper 21 has what may be considered a platform or blank support which generally underlies a stack of blanks and which is adapted to receive a blank released from the hopper upper portion. The platform is formed of a central platform member 45 which has an upper surface sloping upwardly and to the right, as viewed in FIGURE 4, and two like sloping outer platform members 46. The outer platform members 46 are, however, channel shaped in cross section and open upwardly for a purpose to be defined hereinafter. The rear end of the platform member 45 is provided with a wire ramp 47 which is best illustrated in FIGURE 4.

In order to best understand the operation of the hopper, reference is made to FIGURES 5 and 6 wherein there is illustrated an egg carton blank, generally referred to by the numeral 48. The blank 48 may be broadly considered as including a blank body 49 having incorporated therein separator elements 50. It is to be noted that the separator elements 50 project outwardly beyond the blank body 49. When the blanks 48 are properly stacked within the hopper 21, the blank bodies 35 engage against the front guides 35 and pass between the rear guides 38. On the other hand, the projecting separators 50 engage the rear guides 38 to thus position the blanks 38. It is also to be noted that the lowermost carton blank 48 is seated on the shelf 36 and the rear portion thereof rests upon the ramp 47.

In accordance with this invention, a carton blank 48 is removed from the hopper 21 by first engaging the edge of the carton blank 48 which is in engagement with the front guides 35 and moves rearwardly. This results in the bowing of the separator members 50. The blank is moved rearwardly sufficiently to clear the shelf 36, after which it is released. It then drops down onto the platform defined by the platform members 45 and 46 and is urged slightly forwardly, that is, to the left in FIGURE 4, by the downward sloping portion of the ramp 47. In accordance with this invention, during each operation of the feed mechanism 22, a previously released carton blank 48 is moved off of the platform and the carton blank 48 which rests upon the shelf 36 is moved rearwardly and released from the main portion of the hopper 21 so as to drop down on to the platform after the previously released blank has been removed therefrom.

It is the function of the feed mechanism 22 to remove a carton blank 48 from the hopper 21 and then pivot the removed carton blank so that it is aligned with the opening 30. The so positioned carton blank 48 is then forced through the opening 30 to the egg carton setting up mechanism 20 to be acted upon thereby.

In order to assure the movement of a carton blank 48 through the opening 30, there is secured to the table 29 to the left of the opening 30, as viewed in FIGURE 1, a fixed guide 51. The fixed guide 51 has a sloping upper portion 52 which slopes to the left away from the general plane of the opening 30. The end of each of the platform members 46 adjacent the opening 30 is provided with a hinge 53 including a hinge pin 54. The hinge pin 54 mounts for vertical movement a pivotal guide 55, there being two guides 55, one for each of the platform members 46. The pivotal guides 55 are swingable from retracted positions within the platform members 46 to the positions parallel to the lower portions of the fixed guides 51 so as to combine with the fixed guide 51 to define a path which is an extension of the path of the opening 30.

The feed member 56 is provided for moving a released carton blank 48 down the platform into overlying relation with respect to the pivotal guides 55, and then pivoting the pivotal guides 55 to their positions parallel to the fixed guide 51. The feed mechanism 56 includes one feed member 56 for each of the two pivotal guides 55. The feed members 56 are driven in unison by a drive mechanism which is generally referred to by the numeral 57.

The drive mechanism 57 includes a pair of longitudinally extending plates 58 which are spaced transversely of the table 29, as is best shown in FIGURE 2. A drive shaft 60 extends between and through the plates 58 and is suitably journaled in bearings 61 carried by the plates 58. The drive shaft 60 is disposed at the left ends of the plates 58, as is best shown in FIGURE 2. At the right ends of the plates 58, there are stub shafts 62 which extend outwardly from the plates 58. The outer ends of the drive shaft 60 are provided with sprockets 63 which are longitudinally aligned with sprockets 63 rotatably journaled on the stub shafts 62. Endless conveyor chains 65 are entrained over the sprockets 63 and 64. Each plate 58 also carries an intermediate stub shaft 66 on which there is disposed an idler sprocket 67 over which a lower run of each of the drive chains 65 passes, as is best shown in FIGURE 1. The drive shaft 60 is driven by a large sprocket 68 carried by the drive shaft 28 and a smaller sprocket 69 on the drive shaft 60. A drive chain 70 is entrained over the sprockets 68 and 69. It will thus be apparent that the drive shaft 60 is driven at a higher rotational speed than the drive shaft 28.

The endless conveyor chains 63 are provided with outwardly projecting pins 71 which are in alignment. As is best shown in FIGURE 3, on each of the pins 71 there is pivotally mounted a bracket 72. Each bracket 72 is rigidly secured to the left end of an associated arm 73 of the respective drive member 56. For descriptive purposes, each of the feed members 56 will be considered as having its left end as its forward end and its right end as its rear end. Each feed member 56 is provided with an upwardly extending pointed rear end 74 which terminates in a forwardly facing hook 75 on the underside of the arm 73. Also, each arm 73 is provided on the upper surface thereof with a finger 76 which is disposed forwardly of the pointed end 74. As is clearly illustrated in FIGURE 2, the feed members 56 are aligned with the pivotal guides 55.

The operation of the feed members 56 is schematically shown in FIGURES 7 through 15, inclusive. Referring first to FIGURE 7, it will be seen that the feed members 56 are returning from having delivered a carton blank 48 through the opening 30. As the feed members 56 move to the right, the pivotal guides 55 are swung in a clockwise direction and are lowered into the platform members 46. It is to be noted that the hopper 21 has a plurality of blanks 48 supported thereby. These blanks include a closely released carton blank 48a which is resting upon the platform members 45 and 46 and the ramp 47. The carton blanks also include a lowermost carton blank 48b of the stack of carton blanks which is directly resting upon the shelf 36.

Referring now to FIGURE 8, it will be seen that when the feed members 56 reach the position shown in this view, the pivotal guides 55 are released and the pointed ends 74 of the feed members 58 are riding up on the carton blank 48a. When the pivotal guides 55 are released, they move to recessed positions within the upper portions of the platform members 46, as is best shown in FIGURE 6.

Figure 9:
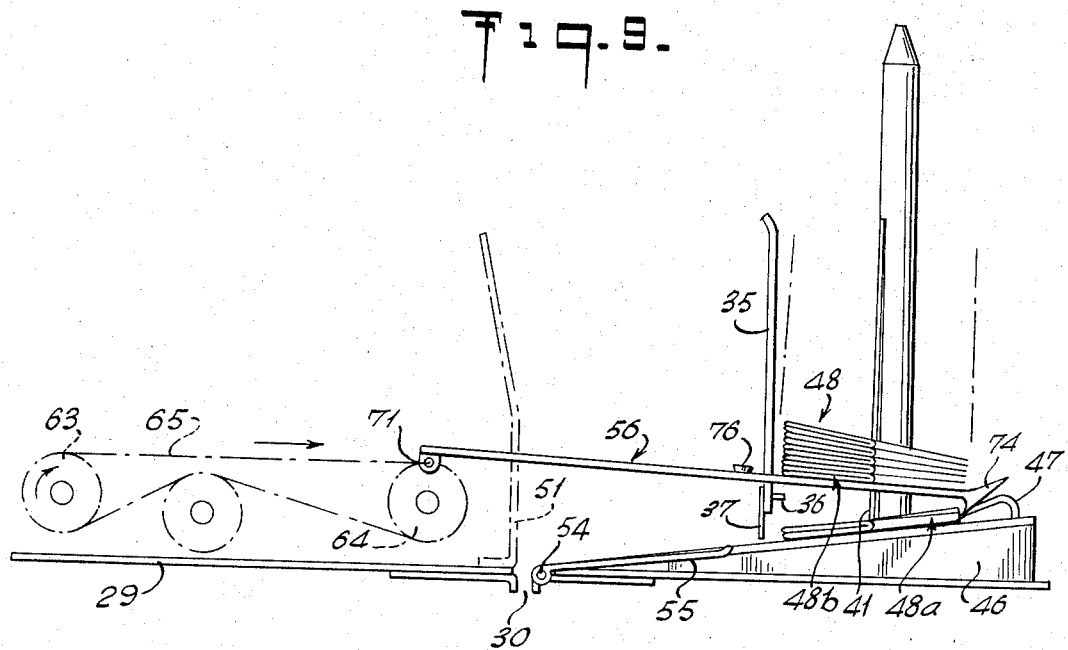
FIGURE 9 is a schematic view showing the feed member moved beneath the stack of blanks in the hopper and moving to a position for engagement with the previously released blank.

The feed members 58 continue to move rearwardly and in FIGURE 9 the pointed ends 74 thereof have passed entirely beneath the carton blanks 48 disposed in the stack with the stacked carton blanks being lifted slightly upwardly. In FIGURE 10 it will be seen that the rear portion of each of the feed members 58 has ridden off of the released carton blank 48a and the stack of carton blanks 48 is again lowered. At this time, the fingers 76 of the feed members 58 engage the edge of the carton blank 48a which bears against the front guides 35. At this time, it is pointed out that the fingers 76 are generally dovetailed in outline so as to assure a positive gripping of the carton blank 48b by the fingers 76.

In FIGURES 10a, 10b and 10c, the specific relationship of the feed members 58 with respect to the platform members 46, the released carton blank 48a and the stack of carton blanks 48 is clearly illustrated.

Referring now to FIGURES 11, 11a, 11b and 11c, it will be seen that further movement of the feed members 58 to the right results in the fingers 76 forcing the left hand edge of the lowermost carton blank 48b to the right. However, since the separator members 50 bear against the rear guides 38, the separator members 50 cannot move rearwardly but are bowed, as is best illustrated in FIGURE 11c.

It is to be noted that when the carton blank 48b is engaged by the fingers 76 in FIGURE 11, the pins 71 carrying the feed members 56 are disposed at the midpoints of the heights of their respective sprockets 64. Continued movement of the endless chains 65 results primarily in the downward movement of the left ends of the feed members 58 with the result that the edge of the carton blank 48b engaged by the fingers 76 is lowered below the shelf 36. Thus as the feed members 56 begin to move to the left, as viewed in FIGURE 11, the carton blank 48b will miss the shelf 36 and drop down on to the tops of the feed members 56, as is clearly shown in FIGURES 12 and 12a. The forward movement of the feed members 58 from the position shown in FIGURE 11 to the position shown in FIGURE 12 results in the hooks 75 engaging the rear edge of the carton blank 48a.

Continued forward movement of the feed members 56 results in the movement of the carton blank 48a along the platform members 45 and 46 to a position overlying the pivotal guides 55, as is clearly shown in FIGURES 13 and 13a.

After the hooks 75 move the carton blanks 48 on to the pivotal guides 55, the hooks 75 engage the edges of the pivotal guides 55 so that continued forward movement of the feed members 56 results in the upward swinging of the pivotal guides 55 in a counterclockwise direction, as is best shown in FIGURE 14. Continued movement of the feed members 56 to the left in a forward direction results in the pivotal guides 55 swinging upwardly to positions parallel to the fixed guide 51, at which time the carton blank 48a has moved to a position in alignment with the opening 30 for movement down through the opening 30 to the carton setting up mechanism 20.

Means are provided for forcing carton blanks down through the opening 30. To this end, a shaft 80 extends between and is secured to the plates 58. The shaft 80 has a bearing member 81 pivotally mounted on the central portion thereof, and a bracket 82 is secured to the bearing member 81 for pivotal movement therewith. An elongated arm 83 is rigidly secured to the bracket 82 and is provided at the forward end thereof with a transverse member 84. A pair of carton engaging heads 85 are secured to opposite ends of the transverse member 84 and in parallel relation to the arm 83. The heads 85 are aligned with slots 86 formed in the fixed guide 51. Indicentally, similar slots 87 are formed in the fixed guide 51 for the passage of the feed members 56.

A cam 88 is mounted on the drive shaft 60 for rotation relative thereto. The cam 88, which is best shown in FIGURE 4, is engaged with a cam follower 89 carried by a depending portion 90 of the arm 83. The arm 83 is constantly urged downwardly by a spring 91 which has a lower end suitably anchored adjacent the table 29 and an upper end selectively engaged in one of a plurality of openings 92 formed in the arm 83.

A sprocket 93 is secured to the cam 88 for rotation therewith. The sprocket 93, which is relatively large as compared to the sprocket 69, is aligned with a smaller sprocket 94 secured to the drive shaft 98 for rotation therewith. A drive chain 95 is entrained over the sprockets 93 and 95 and drivingly connects the cam 88 to the drive shaft 28.

It is to be noted that the spring 91 continuously urges the heads 85 downardly. However, the cam follower 89, in engagement with the cam 88 prevents this downward movement. When the cam 88 rotates in timed relation to the positioning of the carton blank in alignment with the opening 30, the heads 85 are released to move downwardly and engage the upper edge of the carton blank aligned with the opening 30. The heads 85 continue to move downwardly, as is shown in FIGURES 16 and 17, until the carrier blank aligned with the opening, for example the carrier blank 48a, is completely delivered to the egg carton setting mechanism 20. The heads 85 then return upwardly, after which the feed members 56 again move to the right to lower the pivotal guides 55 in the manner previously described.

It is to be understood that the pivotal guides 51 may be slightly spring-urged towards their return positions within the platform members 46. On the other hand, they may fall back to these positions due to gravitational forces. In any event, should foreign matter, such as the element 96 illustrated in FIGURE 18, enter between one of the pivotal guides 55 and its associated platform member 46 so as to prevent the normal clockwise swinging movement of the pivotal guides 55, means are provided for stopping the operation of the egg carton setting up mechanism as well as the feed mechanism.

Referring now to FIGURE 19 in particular, it will be seen that the upper portion 52 of the fixed guide 51 is provided with a pair of transversely aligned brackets 98. A transverse rocker shaft 100 is pivotally mounted in the brackets 98. A pair of movement limiting members 101 are rigidly secured to the rocket shaft 100 in overlying relation to the path of movement of the feed members 56. The right ends of the movement limiting members 101 are in the form of hooks 102 for engagement beneath the transverse member 34 to limit the upward swinging movement thereof.

The right end of the rocket shaft 100, as viewed in FIGURE 19, is provided with a depending arm 103 to which there is secured a coil spring 104 normally urging the rocker shaft 100 to rotate in a clockwise direction. The arm 103 is normally held in engagement with a switch arm 105 of a motor controlling switch 106 which is suitably mounted on the table 29 in alignment with the arm 103. It will be readily apparent from FIGURE 18 that when the downward movement of one of the pivotal guides 55 is prevented, the pointed end 74 of the associated feed member 56 will move upwardly as the feed member 58 slides over the upper end of the pivotal guides 55 and come into engagement with the movement limiting member 101 aligned with the particular feed member 58. The movement limiting member 101 is caused to move upwardly from its normal guide line position of FIGURE 18 with the result that the rocker shaft 100 is rotating in the counterclockwise direction and the lower portion of the arm 103 moves to the right permitting the opening of the switch 106 by releasing the switch arm 105 which is spring-urged to a switch opening position.

As soon as the foreign matter 96 is removed and the previously held pivotal guide 55 is released, the operation of the mechanism automatically continues.

It will be readily apparent that the feed mechanism 22 is automatic in operation and the construction of the hopper 21 is such that it is merely necessary for an attendant to maintain a supply of carton blanks 48 within the hopper 21. It is also to be understood that the operation of the egg carton setting up mechanism, which is not a part of this invention, is also automatic.

Although only a preferred embodiment of the invention has been specifically illustrated and described herein, it is to be understood that minor variations may be made in the structure and operation of the feed mechanism within the spirit and scope of the invention, as defined in the appended claims.

I claim:

1. A feed mechanism comprising means defining an article dispensing path, a fixed article guide disposed to one side of said article dispensing path, a pivotal article guide mounted adjacent said fixed article guide on the opposite side of said path therefrom and single means for sequentially positioning an article on said pivotal article guide and then swinging said pivoted article guide towards a position generally parallel to said fixed article guide to position the article in said path.

2. The feed mechanism of claim 1 wherein said single means includes hook means for first engaging an article and then engaging said pivotal article guide.

3. The feed mechanism of claim 1 wherein said single means includes a member having a hook on one end facing said article dispensing path, and means pivotally connected to the opposite end thereof for effecting the reciprocation of said member transversely of said article dispensing path while permitting the pivoting thereof.

4. The feed mechanism of claim 1 wherein said single means includes a member having a hook on one end facing said article dispensing path and an endless conveyor pivotally connected to the opposite end thereof for effecting the reciprocation of said member transversely of said article dispensing path while permitting the pivoting thereof.

5. A feed mechanism comprising a fixed article guide, an article supporting platform, an article receiving opening intermediate said fixed article guide and said platform, a pivotal article guide mounted adjacent said fixed article guide on the opposite side of said opening for movement between a position recessed in said platform and a position parallel to said fixed article guide to position an article in said opening, and means for moving an article from said platform onto said pivotal article guide and swinging said pivotal article guide towards the position generally parallel to said fixed article guide to position the article in the opening.

6. A feed mechanism comprising a fixed article guide, an article supporting platform, an article receiving opening intermediate said fixed article guide and said platform, a pivotal article guide mounted adjacent said fixed article guide on the opposite side of said opening for movement between a position recessed in said platform and a position parallel to said fixed article guide to position an article in said opening, and single means for first moving an article from said platform onto said pivotal article guide and then swinging said pivotal article guide towards the position generally parallel to said fixed article guide to position the article in the opening.

7. The feed mechanism of claim 6 wherein said means includes a member having a hook on one end facing said fixed article guide, and means pivotally connected to the opposite end thereof for effecting the reciprocation of said member towards and away from said fixed article guide while permitting the pivoting thereof.

8. The feed mechanism of claim 1 wherein said single means includes a member having a hook on one end facing said article dispensing path, means pivotally connected to the opposite end thereof for effecting the reciprocation of said member transversely of said article dispensing path while permitting the pivoting thereof, and movement limiting means aligned with said member for limiting the pivoting thereof outwardly from said pivotal article guide.

9. A feed mechanism comprising a fixed article guide, an article supporting platform, an article receiving opening intermediate said fixed article guide and said platform, a pivotal article guide mounted adjacent said fixed article guide on the opposite side of said opening for movement between a position recessed in said platform and a position parallel to said fixed article guide to position an article in said opening, an endless conveyor disposed on the side of said fixed article guide remote from said opening and generally lying in a plane normal to the plane of said fixed article guide, a feed member having one end pivotally connected to said endless conveyor for reciprocating movement thereby and the other end provided with a hook for engaging both an article and said pivotal article guide, said feed member being slidable over said platform to first engage an article seated on said platform and slide the article onto said pivotal article guide and then engage said pivotal article guide to swing said pivotal article guide and the article toward said fixed article guide, and means for forcing the article through said opening when the article is aligned with said opening.

10. A feed mechanism comprising a fixed article guide, an article supporting platform, an article receiving opening intermediate said fixed article guide and said platform, a pivotal article guide mounted adjacent said fixed article guide on the opposite side of said opening for movement between a position recessed in said platform and a position parallel to said fixed article guide to position an article in said opening, an endless conveyor disposed on the side of said fixed article guide remote from said opening and generally lying in a plane normal to the plane of said fixed article guide, a feed member having one end pivotally connected to said endless conveyor for reciprocating movement thereby and the other end provided with a hook for engaging both an article and said pivotal article guide, said feed member being slidable over said platform to first engage an article seated on said platform and slide the article onto said pivotal article guide and then engage said pivotal article guide to swing said pivotal article guide and the article toward said fixed article guide, and means for forcing the article through said opening when the article is aligned with said opening, a cam driving said article forcing means, and drive means from a single drive shaft driving said cam and said endless conveyor in timed relation and at different speeds.

11. An article dispensing and feed mechanism comprising a support, upstanding front and rear guides projecting above said support, a supporting shelf extending rearwardly from said front guide, and a reciprocating member beneath said shelf, said member having an upstanding finger engageable with an article resting on said shelf to move the article off of said shelf during the rearward travel of said member, a forwardly facing hook on said member for engaging a previously released article seated on a platform of said support and moving the hook engaged article forwardly during the forward travel of said member, and a rearwardly facing pointed end on said member for engagement between an article seated on said platform and a lower article seated on said shelf to separate the platform supported article and the shelf supported article.

12. The feed mechanism of claim 1 wherein said single means includes a member having a hook on one end facing said article dispensing path, means pivotally connected to the opposite end thereof for effecting the reciprocation of said member transversely of said article dispensing path while permitting the pivoting thereof, movement limiting means aligned with said member for limiting the pivoting thereof outwardly from said pivotal article guide, said feed mechanism including a drive unit, and control means for said drive unit including a stop unit operable by said movement limiting means.

13. An article dispensing and feeding mechanism comprising a support, upstanding front and rear guides projecting above said support, a supporting shelf extending rearwardly from said front guide, a fixed article guide disposed at one side of said support, a pivotal article guide mounted adjacent said fixed article guide and intermediate said fixed article guide and said support, and single means for moving a lower article rearwardly off of said shelf towards said support and for feeding a previously released article from said support onto said pivotal article guide and then swinging said pivotal article guide towards a position generally parallel to said fixed article guide to position the article along an article dispensing path extending between the two then parallel article guides.

14. An article dispensing and feeding mechanism comprising a support, upstanding front and rear guides projecting above said support, a supporting shelf extending rearwardly from said front guide, a fixed article guide disposed at one side of said support, a pivotal article guide mounted adjacent said fixed article guide and intermediate said fixed article guide and said support, and single means for moving a lower article rearwardly off of said shelf towards said support and for feeding a previously released article from said support onto said pivotal article guide and then swinging said pivotal article guide towards a position generally parallel to said fixed article guide to position the article along an article dispensing path extending between the two then parallel article guides, said means being in the form of a reciprocating member disposed beneath said supporting shelf and normally overlying said pivotal article guide, said reciprocating member having an upstanding finger engageable with an article resting on said shelf to move the article off of said shelf during the rearward travel of said member, a forwardly facing hook on said member for engaging a previously released article seated on said support and moving the hook engaged article forwardly during the forward travel of said member, and a rearwardly facing pointed end of said member for engagement between an article seated on said support and a lower article seated on said shelf to separate the support supported article and the shelf supported article.

15. An article dispensing and feeding mechanism comprising a support, upstanding front and rear guides projecting above said support, a supporting shelf extending rearwardly from said front guides, and a reciprocating feed member positioned beneath said shelf and above said support, said feed member comprising an elongated arm having a rearwardly directed pointed end at one end for engagement between an article seated on said shelf and a previously released article seated on said support, an upstanding finger on said arm spaced forwardly from said pointed end directly engageable with an article resting on said shelf to move the article off of said shelf during the rearward travel of said feed member, and a downwardly and forwardly directed hook adjacent said pointed end for directly engaging a previously released article seated on said support and moving the hook engaged article forwardly during the forward travel of said feed member.

References Cited

UNITED STATES PATENTS

| | | | |
|---|---|---|---|
| 121,873 | 12/1871 | Hoffman | 294—26 X |
| 179,127 | 6/1876 | Norcross | 294—19 X |
| 197,888 | 12/1877 | Pene | 294—26 X |
| 269,767 | 12/1882 | Wilson | 294—2 |
| 336,357 | 2/1886 | Taylor | 294—2 |
| 1,134,651 | 4/1915 | Trammel | 221—63 |
| 1,304,323 | 5/1919 | Kaye | 221—236 |
| 1,311,618 | 7/1919 | Penn | 294—26 |
| 1,398,766 | 11/1921 | Brooker | 221—225 |
| 1,876,211 | 9/1932 | Dyhrberg | 214—7 X |
| 1,983,755 | 12/1934 | Heichert | 214—1 |
| 2,026,781 | 1/1936 | Geer. | |
| 2,297,583 | 9/1942 | Rowlands. | |
| 2,359,807 | 10/1944 | Testi | 221—1 |
| 2,390,298 | 12/1945 | Glassner | 221—211 |
| 2,463,928 | 3/1949 | Wennerberg | 221—236 X |
| 2,672,244 | 3/1954 | Van Schie | 221—236 |
| 2,770,392 | 11/1956 | Roberts | 221—1 |
| 2,834,510 | 5/1958 | Cenotti | 221—224 X |
| 2,940,613 | 6/1960 | Prentice et al. | |
| 3,074,595 | 1/1963 | Boller | 221—225 X |
| 3,091,362 | 5/1963 | Robinson | 294—26 X |

ROBERT B. REEVES, *Primary Examiner.*

KENNETH N. LEIMER, *Examiner.*

LOUIS J. DEMBO, *Assistant Examiner.*